US009916178B2

(12) United States Patent
Dinan et al.

(10) Patent No.: US 9,916,178 B2
(45) Date of Patent: Mar. 13, 2018

(54) TECHNOLOGIES FOR INTEGRATED THREAD SCHEDULING

(71) Applicant: Intel Corporation, Santa Clara, CA (US)

(72) Inventors: James Dinan, Hudson, MA (US); Mario Flajslik, Hudson, MA (US); Tom St. John, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 220 days.

(21) Appl. No.: 14/866,572

(22) Filed: Sep. 25, 2015

(65) Prior Publication Data

US 2017/0090979 A1 Mar. 30, 2017

(51) Int. Cl.

*G06F 9/50* (2006.01)
*G06F 9/46* (2006.01)
*G06F 9/48* (2006.01)

(52) U.S. Cl.

CPC .............. *G06F 9/46* (2013.01); *G06F 9/4881* (2013.01); *G06F 9/5027* (2013.01); *G06F 9/5038* (2013.01)

(58) Field of Classification Search

None

See application file for complete search history.

(56) References Cited

U.S. PATENT DOCUMENTS 9,104,500 B1 8/2015 Krikellas et al.
2003/0126186 A1 7/2003 Rodgers et al.
2007/0074217 A1 3/2007 Rakvic et al.
2013/0204965 A1 8/2013 Masputra et al.
2014/0223437 A1 8/2014 Chang et al.
2015/0347192 A1* 12/2015 Blaine .................. G06F 9/4881 718/103
2016/0357600 A1* 12/2016 Chimene .............. G06F 9/5011

OTHER PUBLICATIONS

Carver et al., Relinquishing resources held by blocked thread was disclosed in "Modern Multithreading: Implementing, Testing, and Debugging Multithreaded Java and C++/Pthreads/Win32 Programs", Nov. 28, 2005, John Wiley & Sons, p. 98.*

International search report for PCT application No. PCT/US2016/052616, dated Jul. 3, 2017 (4 pages).

Written opinion for PCT application No. PCT/US2016/052616, dated Jul. 3, 2017 (8 pages).

* cited by examiner

*Primary Examiner* — Qing Wu

(74) *Attorney, Agent, or Firm* — Barnes & Thornburg LLP

(57) ABSTRACT

Technologies for integrated thread scheduling include a computing device having a network interface controller (NIC). The NIC is configured to detect and suspend a thread that is being blocked by one or more communication operations. A thread scheduling engine of the NIC is configured to move the suspended thread from a running queue of the system thread scheduler to a pending queue of the thread scheduling engine. The thread scheduling engine is further configured to move the suspended thread from the pending queue to a ready queue of the thread scheduling engine upon determining any dependencies and/or blocking communications operations have completed. Other embodiments are described and claimed.

25 Claims, 5 Drawing Sheets

TECHNOLOGIES FOR INTEGRATED THREAD SCHEDULING

GOVERNMENT RIGHTS CLAUSE

This invention was made with Government support under contract number H98230-13-D-0124 awarded by the Department of Defense. The Government has certain rights in this invention.

BACKGROUND

Modern computing devices have become ubiquitous tools for personal, business, and social uses. As such, many modern computing devices are capable of connecting to various data networks, including the Internet and corporate intranets, to transmit and receive data communications over the various data networks at varying rates of speed. To facilitate communications between remotely located computing devices, the data networks typically include one or more network computing devices (e.g., network switches, network routers, servers, other compute and/or store computing devices, etc.) to process and route network communications (i.e., network packets) through the data network. Certain network infrastructures, such as data centers, may include tens of thousands or more of such computing devices deployed in parallel and/or distributed computing architectures (e.g., a high performance computing (HPC) network architecture) capable of high-speed, low-latency interconnectivity, such as a cluster computing network architecture and/or a grid computing network architecture (e.g., a fabric computing network architecture).

Applications (i.e., threads, processes, etc.) running on such vast network infrastructures may become blocked while waiting for locally issued communication operation(s) to complete or while waiting for data to arrive as the result of a remotely performed communication operation, for example. The blocked thread can be unscheduled by a scheduler (i.e., a system thread/process scheduler), which can then schedule a ready thread to execute on the resources previously occupied by the unscheduled blocked thread. Conventional approaches to thread scheduling utilize software schedulers, which typically use software techniques to determine whether pending threads have become ready for execution. Additional software techniques may utilize polling, memory monitoring, or interrupt-based notifications to indicate that communication operations have completed or that data has been written to local memory of the computing device. However, such software techniques can generate significant software-attributable overhead and/or impact locality in memory of the computing device.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
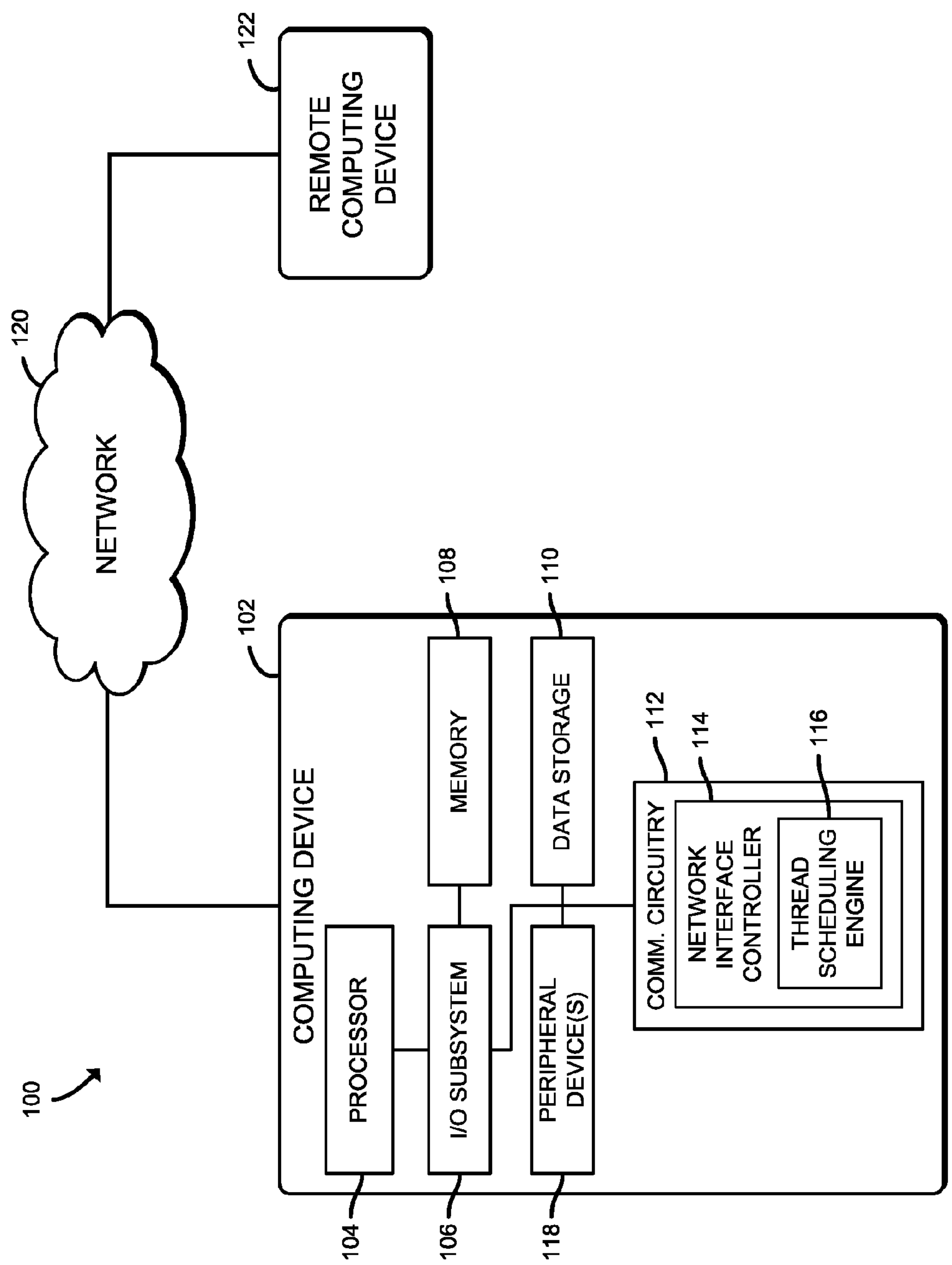
FIG. 1 is a simplified block diagram of at least one embodiment of a system for integrated thread scheduling that includes a computing device communicatively coupled over a network to a remote computing device.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C): (A and B); (A and C); (B and C); or (A, B, and C). Similarly, items listed in the form of "at least one of A, B, or C" can mean (A); (B); (C): (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for integrated thread scheduling includes a computing device 102 communicatively coupled to a remote computing device 122 over a network 120. In use, the computing device 102 processes and transmits messages (e.g., network communications, network packets, etc.) to the remote computing device 122, as well as receives and processes messages from the remote computing device 122. It should be appreciated that, while a single remote computing device 122 is illustrated in FIG. 1, the system 100 may include multiple remote computing devices in other embodiments.

As will be described in further detail below, the computing device 102 is configured to move threads that become blocked by one or more communication operations from a system thread scheduler (e.g., the system thread scheduler module 260 of FIG. 2) to a pending queue (e.g., the pending queue 224 of FIG. 2) of a thread scheduling engine 116 of a network interface controller (NIC) 114 of the computing device 102. Accordingly, when one of the communication operations completes, a completion tracking mechanism (e.g., the thread dependency tracking module 230 of FIG. 2) internal to the NIC 114 can provide an indication of the communication operation completion (e.g., send a notification) to the thread scheduling engine 116 within the NIC 114, thereby reducing software-attributable overhead associated with conventional software-based thread schedule management technologies.

The thread scheduling engine 116 can determine whether the communication operation that completed has resolved any dependencies of the blocked thread. As such, the thread scheduling engine 116 can notify the system thread scheduler that the previously blocked thread is ready to be scheduled for execution upon a determination that the communication operation(s) and/or other dependencies have been completed. Additionally, the thread scheduling engine 116 can move the no longer blocked thread from the pending queue to a ready queue (e.g., the ready queue 228 of FIG. 2) of the thread scheduling engine 116. It should be appreciated that, in some embodiments, as described in further detail below, the pending and ready queues of the thread scheduling engine 116 may be implemented using various technologies, such as locally managed offsets, one or more match list entries and event queues, etc.

As shown in FIG. 1, the illustrative computing device 102 includes a processor 104, an input/output (I/O) subsystem 106, a memory 108, a data storage device 110, communication circuitry 112, and one or more peripheral device(s) 118. Of course, the computing device 102 may include other or additional components, such as those commonly found in a network device (e.g., a switch, a server, a computing node, etc.), in other embodiments. Additionally, in some embodiments, one or more of the illustrative components may be incorporated in, or otherwise form a portion of, another component. For example, the memory 108, or portions thereof, may be incorporated in the processor 104, in some embodiments. Further, in some embodiments, one or more of the illustrative components may be omitted from the computing device 102.

The processor 104 may be embodied as any type of processor capable of performing the functions described herein. For example, the processor 104 may be embodied as a single or multi-core processor(s), digital signal processor, microcontroller, or other processor or processing/controlling circuit. Similarly, the memory 108 may be embodied as any type of volatile or non-volatile memory or data storage capable of performing the functions described herein. In operation, the memory 108 may store various data and software used during operation of the computing device 102 such as operating systems, applications, programs, libraries, and drivers.

The memory 108 is communicatively coupled to the processor 104 via the I/O subsystem 106, which may be embodied as circuitry and/or components to facilitate input/output operations with the processor 104, the memory 108, and other components of the computing device 102. For example, the I/O subsystem 106 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 106 may form a portion of a system-on-a-chip (SoC) and be incorporated, along with the processor 104, the memory 108, and other components of the computing device 102, on a single integrated circuit chip.

The data storage device 110 may be embodied as any type of device or devices configured for short-term or long-term storage of data such as, for example, memory devices and circuits, memory cards, hard disk drives, solid-state drives, or other data storage devices. The data storage device 110 and/or the memory 108 (e.g., computer-readable storage media) may store various data during operation of the computing device 102 as described herein, including operating systems, applications, programs, libraries, drivers, instructions, etc., capable of being executed by a processor (e.g., the processor 104) of the computing device 102.

The communication circuitry 112 may be embodied as any communication circuit, device, or collection thereof, capable of enabling communications between the computing device 102 and other remote computing devices (e.g., the remote computing device 122) over a network (e.g., the network 120). The communication circuitry 112 may be configured to use any one or more communication technologies (e.g., wireless or wired communication technologies) and associated protocols (e.g., Ethernet, Bluetooth®, WiFi®, WiMAX, LTE, 5G, etc.) to effect such communication. In some embodiments, the communication circuitry 112 is configured to perform high-speed communication (e.g., in a high performance compute (HPC) cluster) with other computing devices (e.g., the remote computing device 122).

The illustrative communication circuitry 112 may be embodied as, or otherwise include, the NIC 114. The NIC 114 may be embodied as one or more add-in-boards, daughtercards, network interface cards, controller chips, chipsets, or other devices that may be used by the computing device 102. For example, in some embodiments, the NIC 116 may be integrated with the processor 104, embodied as an expansion card coupled to the I/O subsystem 108 over an expansion bus (e.g., PCI Express), part of an SoC that includes one or more processors, or included on a multichip package that also contains one or more processors. Additionally or alternatively, in some embodiments, functionality of the NIC 114 may be integrated into one or more components of the computing device 102 at the board level, socket level, chip level, and/or other levels.

As described previously, the NIC 114 additionally includes the thread scheduling engine 116. In other words, the thread scheduling engine 116 may be embodied as hardware circuitry of the NIC 114. As such, it should be further appreciated that, in some embodiments, the NIC 114 may include a processor (not shown) and/or a memory (not shown) that are local to the NIC 114. In such embodiments, the processor of the NIC 114 may be capable of performing the offloaded functions as described herein. Additionally or alternatively, in such embodiments, the memory of the NIC 114 may be capable of storing data local to the NIC 114, such that the memory 108 of the computing device 102 is not affected (i.e., no software latency introduced).

The thread scheduling engine 116 may be embodied as any software, hardware component(s), and/or circuitry capable of integrated thread scheduling, as well as performing any of the other functions described herein. As described previously, the thread scheduling engine 116 is configured to manage blocked threads and track completion of communication operations and any other dependencies of the blocked threads.

The network 120 may be embodied as any type of wired or wireless communication network, including cellular networks (e.g., Global System for Mobile Communications (GSM), 3G, 4G (Long Term Evolution (LTE), Worldwide Interoperability for Microwave Access (WiMAX)), etc.), digital subscriber line (DSL) networks, cable networks (e.g., coaxial networks, fiber networks, etc.), telephony networks, local area networks (LANs) or wide area networks (WANs), global networks (e.g., the Internet), or any combination thereof. Additionally, the network 120 may include any number of may include additional computing devices (i.e., networking devices), physical and/or virtual, that may be commonly found in networks, such as servers, switches, routers, access points, network controllers, etc., that ware not shown for clarity of the description. It should be appreciated that, in some embodiments, the network 120 may be embodied as any type of parallel and/or distributed computing architecture (e.g., a high performance computing (HPC) network architecture) that is capable of high-speed, low-latency interconnectivity, such as a cluster computing network architecture and/or a grid computing network architecture (e.g., a fabric computing network architecture).

Similar to the computing device 102, the remote computing device 122 may be embodied as any type of computation or computing device capable of performing the functions described herein, including, without limitation, a server (e.g., stand-alone, rack-mounted, blade, etc.), a network appliance (e.g., physical or virtual), a web appliance, a distributed computing system, a processor-based system, a multiprocessor system, a smartphone, a mobile computing device, a tablet computer, a laptop computer, a notebook computer, and/or any other computing/communication device. Accordingly, it should be appreciated that the remote computing device 122 may include like and/or similar components to the illustrative computing device 102 of FIG. 1, which are not described herein for clarity of the description.

Figure 2:
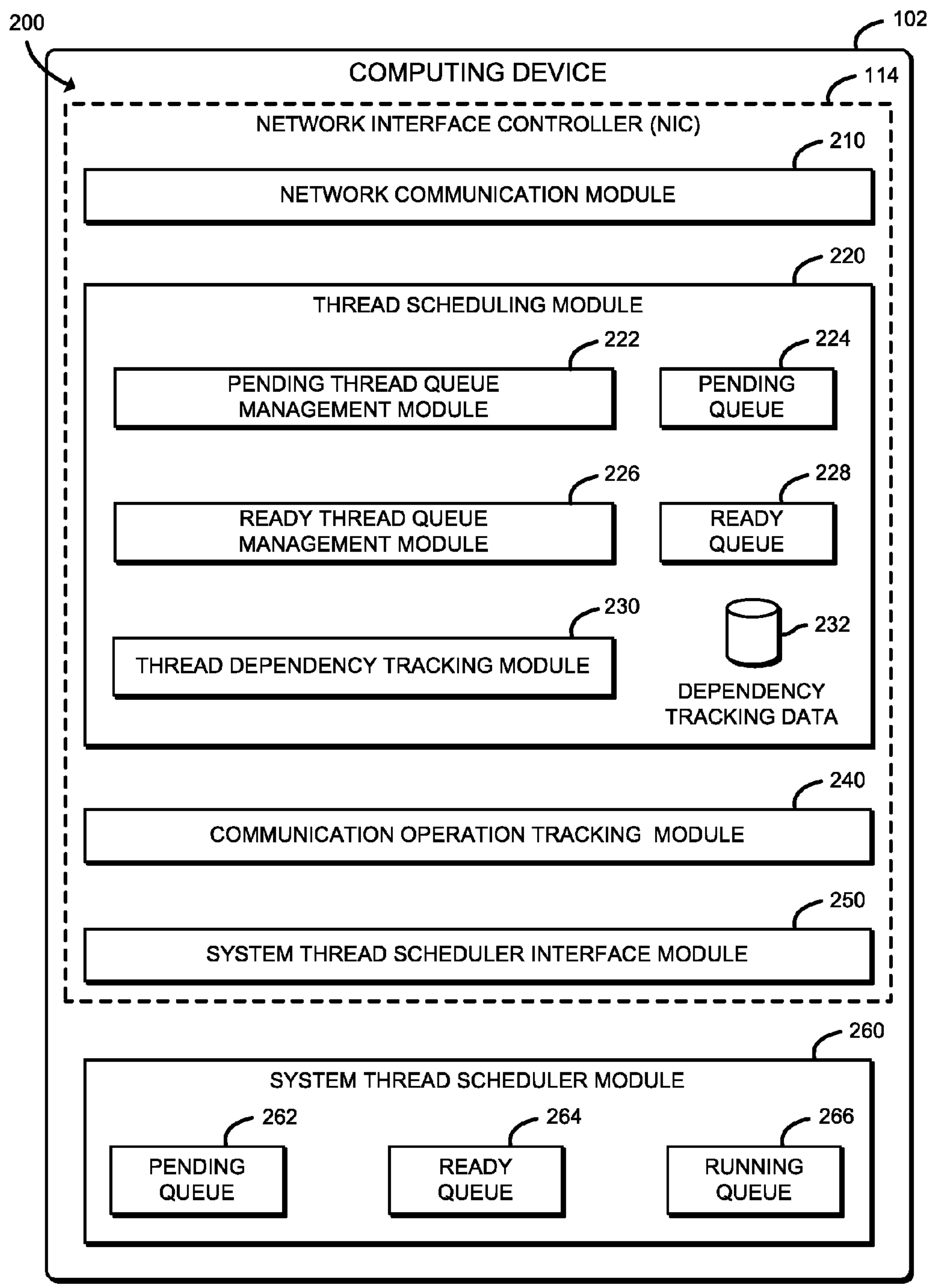
FIG. 2 is a simplified block diagram of at least one embodiment of an environment that may be established by the computing device of the system of FIG. 1.

Referring now to FIG. 2, in an illustrative embodiment, the computing device 102 establishes an environment 200 during operation. The illustrative environment 200 includes a network communication module 210, a thread scheduling module 220, a communication operation tracking module 240, a system thread scheduler interface module 250, and a system thread scheduler module 260. Each of the modules, logic, and other components of the environment 200 may be embodied as hardware, software, firmware, or a combination thereof. For example, each of the modules, logic, and other components of the environment 200 may form a portion of, or otherwise be established by, the processor 104 or other hardware components of the computing device 102. As such, in some embodiments, one or more of the modules of the environment 200 may be embodied as a circuit or collection of electrical devices (e.g., network communication circuitry 210, thread scheduling circuitry 220, communication operation tracking circuitry 240, system thread scheduler interface circuitry 250, and system thread scheduler circuitry 260, etc.). Additionally or alternatively, in some embodiments, one or more of the illustrative modules may form a portion of another module and/or one or more of the illustrative modules and/or submodules, which may be embodied as standalone or independent modules.

As shown in the illustrative environment 200, one or more of the network communication module 210, the thread scheduling module 220, the communication operation tracking module 240, and the system thread scheduler interface module 250 may be integrated into the NIC 114. Accordingly, unlike present technologies employing software that introduces overhead, the hardware offloaded thread management can reduce the software-attributable overhead of the present technologies. It should be appreciated that the computing device 102 may include other additional and/or alternative components, sub-components, modules, sub-modules, circuitry, and/or devices commonly found in a computing device of a network, which are not illustrated in FIG. 2 for clarity of the description.

The network communication module 210 is configured to facilitate (e.g., process and route) inbound and outbound network communications (e.g., messages, network traffic, network packets, network flows, etc.) to and from the computing device 102. To do so, the network communication module 210 is configured to receive and process network communications from other computing devices (e.g., the remote computing device 122) communicatively coupled to the computing device 102 via the network 120. Additionally, the network communication module 210 is configured to generate and transmit network communications to another computing device (e.g., the remote computing device 122) communicatively coupled to the computing device 102 via the network 120. It should be appreciated that, in some embodiments, at least a portion of the functionality of the network communication module 210 may be performed by the communication circuitry 112, and more specifically by the NIC 114.

The thread scheduling module 220 is configured to manage the scheduling of threads blocked due to communication operations. To do so, the illustrative thread scheduling module 220 includes a pending thread queue management module 222 for managing a pending queue 224, a ready thread queue management module 226 for managing a ready queue 228, and a thread dependency tracking module 230. The illustrative thread scheduling module 220 additionally includes dependency tracking data 232 that may be used to store data related to dependencies (i.e., dependent relationships) of blocked threads. It should be appreciated that at least a portion of the thread scheduling module 220 may be performed in hardware of the computing device 102, such as by the thread scheduling engine 116 of FIG. 1.

The pending thread queue management module 222 is configured to manage the pending queue 224 of presently blocked threads. To manage the pending queue 224, the pending thread queue management module 222 is configured to retrieve, or receive, blocked threads, or thread identifying data, from a system thread scheduler (e.g., the system thread scheduler module 260). Additionally, the pending thread queue management module 222 is further configured to transmit threads that are no longer blocked to the ready queue 228 via the ready thread queue management module 226. In use, the pending thread queue management module 222 receives notifications from the thread dependency tracking module 230 when a communication operation and/or dependency of one of the threads in the pending queue 224 completes. Accordingly, prior to transmitting a thread from the pending queue to the ready queue, the pending thread queue management module 222 can determine which thread(s) can be moved from the pending queue to the ready queue based on the received notifications.

The ready thread queue management module 226 is configured to manage the ready queue 228 of threads that are no longer blocked (i.e., ready to be scheduled by a system thread scheduler, such as the system thread scheduler module 260). As described previously, the ready thread queue management module 226 is configured to receive, or retrieve, threads, or thread identifying data, from the pending queue 224 that are no longer blocked as determined by the pending thread queue management module 222. To do so, in some embodiments, the ready thread queue management module 226 may receive a notification from the pending thread queue management module 222 that indicates which thread is no longer blocked by a communication operation or dependency. Accordingly, the notification may include an identifier (e.g., a thread control block (TCB)) of the thread. Additionally, the ready thread queue management module 226 may be further configured to provide an indication to the system thread scheduler module 260 that indicates the ready queue 228 has been updated to include another thread available for execution. In some embodiments, the indication may be transmitting from the ready thread queue management module 226 to the system thread scheduler module via the system thread scheduler interface module 250.

The thread dependency tracking module 230 is configured to determine whether there are any dependencies (e.g., other threads, processes, and/or communication operations) that need to complete before the thread can be moved from the pending queue 224 to the ready queue 228. To do so, the thread dependency tracking module 230 is configured to track dependencies of the threads in the pending queue 224. Accordingly, the thread dependency tracking module 230 may be configured to receive a notification from the pending thread queue management module 222, upon the pending thread queue management module 222 receiving an indication that a thread is blocked, for example. The notification may provide the thread dependency tracking module 230 with information usable by the thread dependency tracking module 230 to identify the thread, and any dependencies of the thread, as well as a present state of each of the identified dependencies. Accordingly, in use, the thread dependency tracking module 230 can provide an indication to the pending thread queue management module 222 that indicates when one or more of the dependencies of the thread have completed. In some embodiments, the dependencies and the states thereof may be stored in the dependency tracking data 232.

The communication operation tracking module 240 is configured to track communication operations of the computing device 102. The communication operations may include any type of operation by the computing device 102, or more specifically by the NIC 114, that involves network communications, such as a send or receive operation, an ordering communication operation, etc. It should be appreciated that other network related communication conditions of the computing device 102 may cause the thread to be blocked, such as waiting for data to arrive over the network 120, for example. The communication operation tracking module 240 is further configured to provide a notification to the thread scheduling module 220 (e.g., to the thread dependency tracking module 230 via the system thread scheduler interface module 250) that indicates a communication operation or dependency of a thread presently in the pending queue 224 has completed.

The system thread scheduler interface module 250 is configured to provide an interface (i.e., facilitate communications) between the thread scheduling module 220 and the system thread scheduler module 260. To do so, the system thread scheduler interface module 250 may be configured to receive notifications from the system thread scheduler module 260 indicating that a thread is blocked (e.g., a blocked notification event) or a communication operation completed (e.g., a completion notification event). Additionally, the system thread scheduler interface module 250 may be further configured to transmit notifications from the ready thread queue management module 226 that indicate a thread has been moved to the ready queue 228 of the thread scheduling module 220 and is therefore in condition to be moved to a queue of the system thread scheduler module 260.

The system thread scheduler module 260 is configured to schedule threads for execution based on available resources of the computing device 102. To do so, the illustrative system thread scheduler module 260 includes a pending queue 262 for threads that are awaiting execution, but may be blocked and/or have one or more dependencies that need to be completed before the thread can be executed, a ready queue 264 for threads that are ready for execution upon resources of the computing device 102 becoming available, and a running queue 266 for threads that are presently being executed by the computing device 102. Accordingly, the system thread scheduler module 260 may be configured to provide a notification to the thread scheduling module 220 that identifies a thread that is presently blocked by a communication operation. It should be appreciated that, in some embodiments, one or more functions of the system thread scheduler module 260 may be performed by the processor 104 of the computing device 102. It should be further appreciated that while the illustrative computing device 102 of FIG. 2 includes a ready queue 228 of the thread scheduling module 220 and a ready queue 264 of the system thread scheduler module 260, in other embodiments a single ready queue may be employed that is accessible by each of the thread scheduling module 220 and the system thread scheduler module 260.

Figure 3:
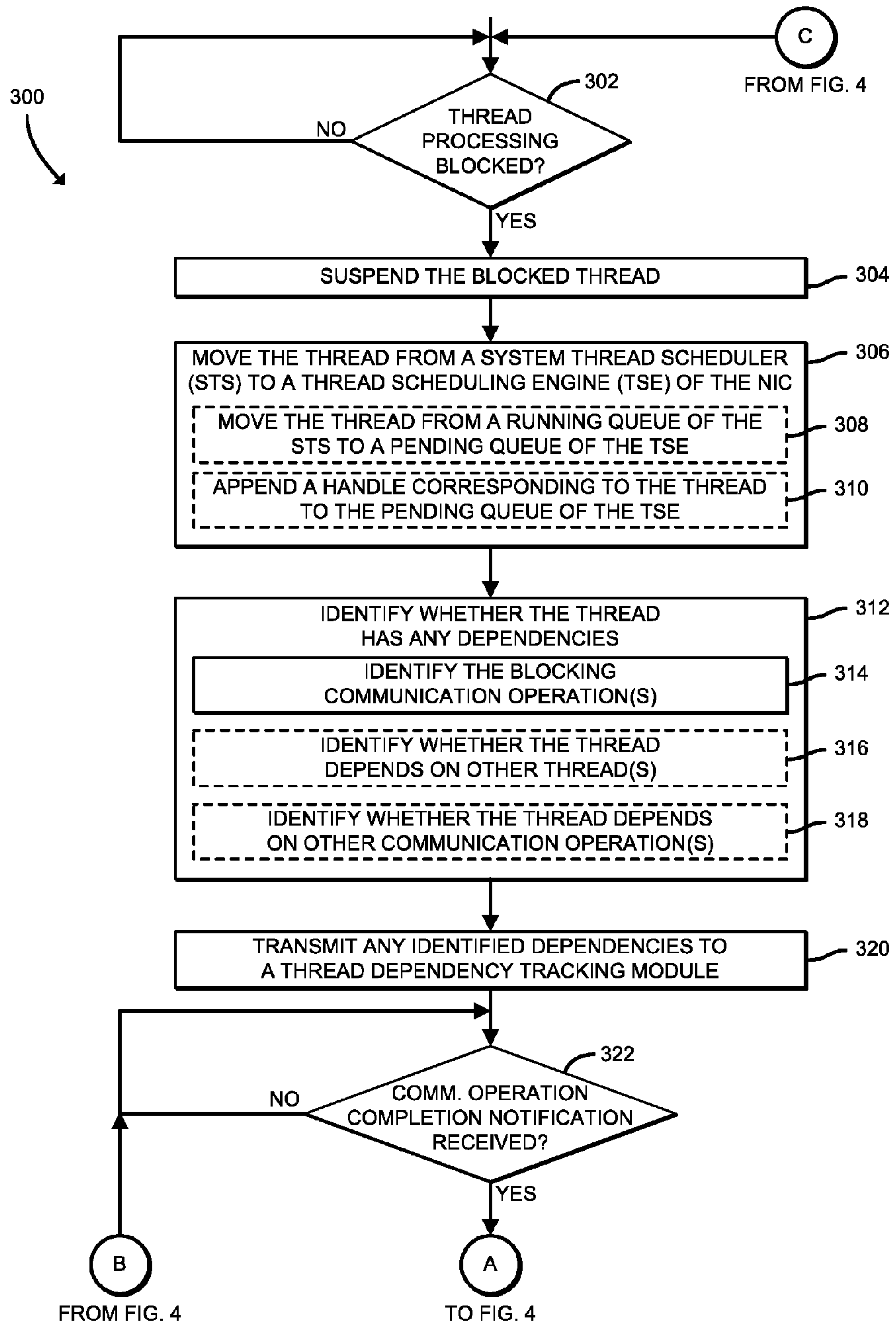
FIGS. 3 and 4 are a simplified flow diagram of at least one embodiment of a method for integrated thread scheduling that may be executed by the computing device of FIGS. 1 and 2.
Figure 4:
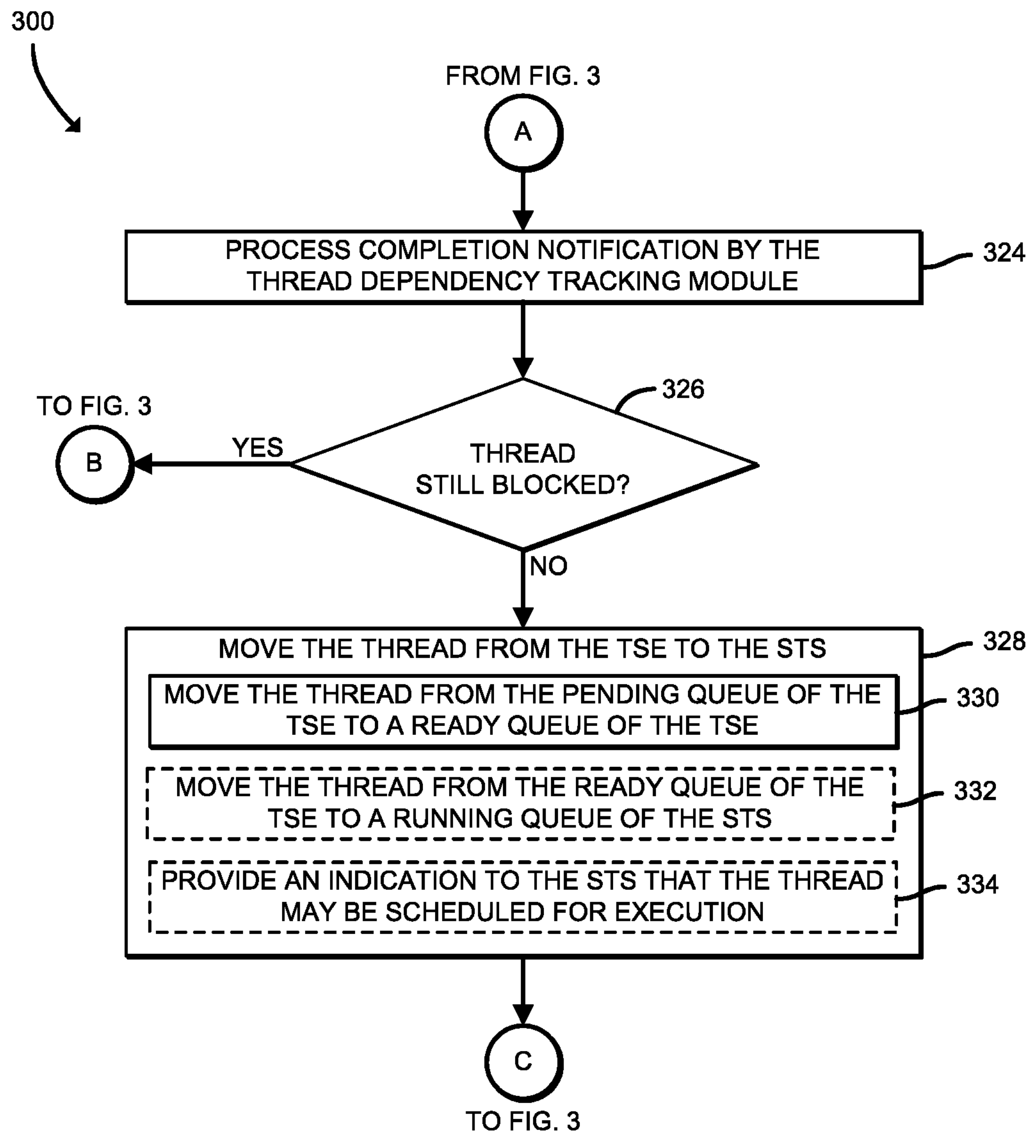

Referring now to FIGS. 3 and 4, in use, the computing device 102 may execute a method 300 for integrated thread scheduling. It should be appreciated that, in some embodiments, the method 300 may be embodied as various instructions stored on a computer-readable media (e.g., memory 108, data storage 110, or other media) and executable by It should be appreciated that at least a portion of the method 300 may be offloaded to and executed by the thread scheduling engine 116 of the computing device 102. The method 300 begins with block 302, in which the computing device 102 determines whether a notification was received from a thread scheduler of the computing device 102 that indicates processing of an executing thread is blocked by at least one communication operation. The communication operation blocking the executing thread may be in response to the thread having performed a blocking communication operation (e.g., a send or receive operation), the thread having performed a function that invokes ordering among communication operations, the thread having performed one or more functions that require completion of pending operations before the thread can proceed, the thread having requested data from a remote computing device (e.g., the remote computing device 122 of FIG. 1) and/or having performed a function that requires data from the remote computing device 122.

If the notification was not received, the method 300 returns to block 302 to continue to determine whether the notification was received. Otherwise, if the notification was received, the method 300 advances to block 304, wherein the computing device 102 (e.g., the processor 104 of the computing device 102 of FIG. 1) suspends the blocked thread. It should be appreciated that a different, ready thread may be placed into the running queue upon suspension of the blocked thread. In block 306, the computing device 102 moves the blocked thread from a system thread scheduler (e.g., the system thread scheduler module 260 of FIG. 2) to the thread scheduling engine 116 of the NIC 114. To do so, in some embodiments, in block 308, the computing device 102 may move the blocked thread from a running queue of the system thread scheduler to a pending queue (e.g., the pending queue 224) of the thread scheduling engine 116. Alternatively, in some embodiments, in block 310, the computing device 102 appends a handle corresponding to the thread to the pending queue of the thread scheduling engine 116.

In block 312, the computing device 102 identifies whether the thread has any dependencies. It should be appreciated that the thread has at least one dependency (i.e., the blocking communication operation(s). Accordingly, in block 314, the computing device 102 identifies the one or more blocking communication operations. Additionally, in some embodiments, in block 316, the computing device 102 identifies whether the blocked thread depends on any other presently executing threads. Additionally or alternatively, in some embodiments, in block 318, the computing device 102 identifies whether the blocked thread depends on one or more other communication operations presently being performed by the computing device 102.

The method 300 advances from block 312 to block 320, wherein the computing device 102 transmits the identified dependencies to the thread dependency tracking module before advancing to block 322. It should be appreciated that, in some embodiments, the system thread scheduler may register one or more dependencies of the thread with the thread scheduling engine 116, or more specifically with the thread dependency tracking module 230 of the thread scheduling module 220 upon notifying the thread scheduling engine 116 of the blocked thread.

If no dependencies of the thread were identified in block 312, the method 300 branches to block 322, wherein the computing device 102 determines whether a communication operation completion notification was received, such as from the communication operation tracking module 240 of FIG. 2 upon completion of a communication operation. It should be appreciated that the completion notification may be generated based on a completion of any type of communication operation, such as a locally initiated send operation or a remotely initiated send operation, for example. The communication operation completion notification may include any identifying information of the communication operation that was completed such that the computing device 102 can identify the corresponding communication operation.

If the computing device 102 determines that the communication operation completion notification was not received, the method loops back to block 322 to continue to wait for the communication operation completion notification to be received. Otherwise, if the communication operation completion notification was received, the method 300 advances to block 324, wherein the computing device 102 processes the completion notification, such as by the thread dependency tracking module 230 of the computing device 102. In block 326, the computing device 102 determines whether the thread is still blocked (e.g., one or more dependencies still executing, one or more communication operations still pending and/or being performed, etc.).

For example, the computing device 102 may determine whether the completion notification satisfied a dependency of any of the threads of the pending queue of the thread scheduling engine 116 (e.g., the pending queue 224 of the thread scheduling module 220). Further, the computing device 102 may determine whether the completion notification satisfied the final dependency (e.g., blocking or non-blocking operations, the last of a series of messages, etc.) of any of the threads of the pending queue of the thread scheduling engine 116. If the thread is still blocked, the method 300 returns to block 322 to determine whether another communication operation completion notification was received. Otherwise, if the thread is no longer blocked, the method 300 advances to block 328.

In block 328, the computing device 102 moves the thread from the thread scheduling engine 116 to the system thread scheduler. To do so, in block 330, the computing device 102 moves the thread from the pending queue of the thread scheduling engine 116 to a ready queue of the thread scheduling engine 116 (e.g., the ready queue 228 of the thread scheduling module 220). Additionally, in some embodiments, in block 332, the computing device may move the thread from the ready queue of the thread scheduling engine 116 to a running queue of the system thread scheduler (e.g., the running queue 266 of the system thread scheduler module 260). Alternatively, in some embodiments, in block 332, the computing device 102 may provide an indication to the system thread scheduler that the previously blocked thread may be scheduled for execution upon a determination by the computing device 102 that the resources of the computing device 102 required to execute the previously blocked thread are available. It should be appreciated that, in some embodiments, the thread may be passed through additional and/or alternative queues before being moved to the running queue of the system thread scheduler. For example, in such an embodiment, the thread may be moved from the ready queue of the thread scheduling engine 116 to the running queue of the system thread scheduler prior to being moved to the ready queue of the system thread scheduler.

It should be appreciated that, in some embodiments, the method 300 may be embodied as various instructions stored on a computer-readable media, which may be executed by the processor 104, the network interface controller 114, and/or other components of the computing device 102 to cause the computing device 102 perform the method 300. The computer-readable media may be embodied as any type of media capable of being read by the computing device 102 including, but not limited to, the memory 108, the data storage 110, local memory of the network interface controller 114, other memory or data storage devices of the computing device 102, portable media readable by a peripheral device of the computing device 102, and/or other media.

Figure 5:
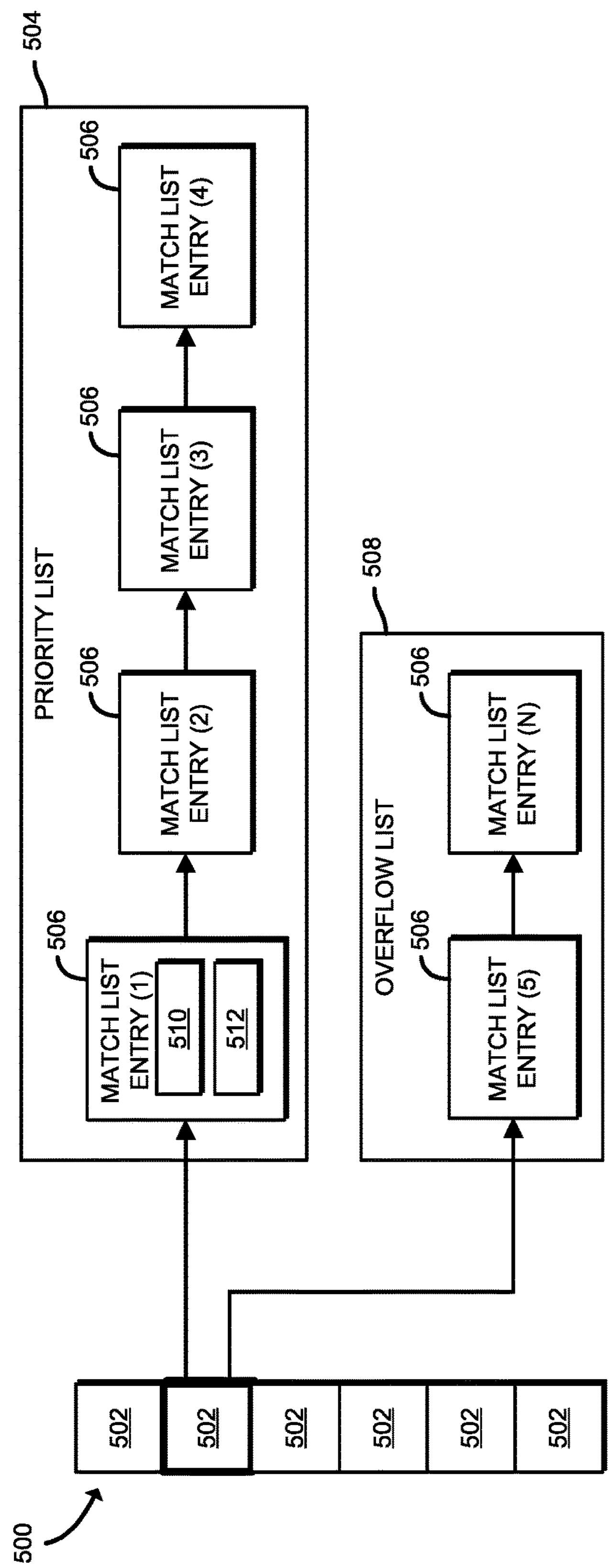
FIG. 5 is a simplified block diagram of at least one embodiment of an implementation of a set of match list entries corresponding to a network port entry of a table of network port entries that may be implemented by the computing device of FIGS. 1 and 2.

Referring now to FIG. 5, an illustrative implementation includes a table 500 of network port entries 502 for directing message delivery of a logical network port. Such network port entries 502 can be used, for example, in a Message Passing Interface (MPI) communication protocol to steer incoming messages on a given logical network port to a correct memory buffer. For example, in an embodiment using the Portals 4.0 Network Programming Interface, the table 500 may be a portal table that includes a number of match list entries 506 associated with each of the network port entries 502 (see, e.g., the match list entries 506 of a priority list 504 and an overflow list 508). It should be appreciated that, in some embodiments, alternative and/or additional or fewer elements may be available in other implementations (e.g., an event queue, an unexpected list, etc.).

Each of the match list entries 506 may include a descriptor 510 for matching against a descriptor of a message received by the computing device 102, such as in response to a "put" message operation. The descriptor of the message may be embodied as, or otherwise include, any type of data indicative of a characteristic of the message, or a characteristic of a series of messages (e.g., a network flow), such as one or more "match" bits, a sender of the message, a size of the message, a destination computing device of the message, a tag associated with the message, and/or any other information, which may be included in the header of the received message, in some embodiments. Each of the match list entries 506 additionally includes an operation 512 which describes the action to be performed upon matching the descriptor 510. For example, the operation 512 may indicate whether to generate an event in response to receiving the message in response to the "put" message operation, which may include a pointer to the TCB of the applicable thread.

In such an embodiment employing the Portals 4 interface, a TCB for each of the threads may be maintained in memory (e.g., the memory 108 of FIG. 1). The TCB may include any data that is capable of being used to identify an attribute of the thread, such as a present state of the thread, a pointer to the TCB, etc. In the Portals 4 implementation, the pending queue of the thread scheduling engine 116 may be implemented on top of a triggered operations list. Accordingly, when a blocked thread is appended to the pending queue, a Portals triggered put operation can be set up. In such embodiments, the destination of the put may be the computing device 102 itself and the source data may be the TCB pointer.

The triggered put operation may be registered with a counter, such as a Portals event counter, whose value can be monitored and compared against a number of identified dependencies. For example, in an embodiment wherein a blocked thread is dependent on five locally issued put operations, upon completion of each of the put operations (e.g., upon a notification generated by the communication operation tracking module 140 being received by the thread scheduling engine 116), the counter may be incremented and the value of which may be compared to the total number of put operations. In such embodiments, the thread dependency tracking module 230 may maintain and manage the counter, and/or perform the comparison between the number of dependencies and the value of the counter, in some embodiments.

In furtherance of the Portals 4 implementation, the ready queue (e.g., the ready queue 228 of the thread scheduling module 220 of FIG. 2) may be implemented by receiving a message generated by a triggered put operation, as described above. In some embodiments, a receive operation may post for each pending thread by appending a match list entry 506 to one of the Portal table entries 502 of table 500 at the NIC 114. In such embodiments, the match list entry 506 may be configured to generate a full unlink event when a corresponding message is received. Additionally, in some embodiments, a Portals event queue may be used to implement the ready queue of the thread scheduling engine 116. Accordingly, in such embodiments, the system thread scheduler may check the Portals event queue to determine whether any previously blocked threads are ready for execution (i.e., can be scheduled for execution by the system thread scheduler). Further, the TCB pointer of the thread may be received by the system thread scheduler such that the system thread scheduler may locate any information of that now-ready thread. Alternatively, in some embodiments, locally managed offset match list entries may further reduce overhead by eliminating the use of full events (i.e., a receive buffer may act as the ready queue of the thread scheduling engine 116).

It should be appreciated that the

EXAMPLES

Illustrative examples of the technologies disclosed herein are provided below. An embodiment of the technologies may include any one or more, and any combination of, the examples described below.

Example 1 includes a computing device for integrated thread scheduling, the computing device comprising a network interface controller comprising a memory device having stored therein a plurality of instructions that, when executed by the network interface controller, causes the network interface controller to detect whether processing of a thread of the computing device is blocked by one or more communication operations; suspend the thread in response to detecting the processing of the thread is blocked; move the suspended thread from a system thread scheduler of the computing device to a thread scheduling engine of a network interface controller of the computing device; identify whether the thread has one or more dependencies; determine whether each of the one or more communication operations has completed; determine, in response to a determination that the thread has the one or more dependencies, whether the one or more dependencies have been satisfied; and move the thread from the thread scheduling engine to the system thread scheduler in response to a determination that (i) each of the one or more communication operations has completed and (ii) each of the one or more dependencies has been satisfied.

Example 2 includes the subject matter of Example 1, and wherein to move the thread from the system thread scheduler to the thread scheduling engine comprises to move the thread from a running queue of the system thread scheduler to a pending queue of the thread scheduling engine.

Example 3 includes the subject matter of any of Examples 1 and 2, and wherein to move the thread from the thread scheduling engine to the system thread scheduler includes to move the thread from a pending queue of the thread scheduling engine to a ready queue of the thread scheduling engine prior to the thread being moved to the system thread scheduler.

Example 4 includes the subject matter of any of Examples 1-3, and wherein to move the thread from the thread scheduling engine to the system thread scheduler further includes to move the thread from the pending queue of the thread scheduling engine to one of a running queue of the system thread scheduler or a ready queue of the system thread scheduler.

Example 5 includes the subject matter of any of Examples 1-4, and wherein to move the thread from the thread scheduling engine to the system thread scheduler comprises to provide an indication to the thread scheduling engine that indicates the thread may be scheduled for execution.

Example 6 includes the subject matter of any of Examples 1-5, and wherein to move the thread from the system thread scheduler to the thread scheduling engine comprises to append a handle corresponding to the thread to a pending queue of the thread scheduling engine.

Example 7 includes the subject matter of any of Examples 1-6, and wherein to identify whether the thread has one or more dependencies comprises to identify whether the thread depends on one or more other threads.

Example 8 includes the subject matter of any of Examples 1-7, and further comprising a system-on-a-chip (SoC) that includes one or more processors and the network interface controller.

Example 9 includes the subject matter of any of Examples 1-8, and further comprising a multichip package that includes one or more processors and the network interface controller.

Example 10 includes the subject matter of any of Examples 1-9, and wherein to identify whether the thread has one or more dependencies comprises to identify whether the thread depends on one or more communication operations.

Example 11 includes the subject matter of any of Examples 1-10, and wherein the plurality of instructions further causes the network interface controller to transmit the one or more dependencies to thread dependency tracking circuitry of the thread scheduling engine; and transmit the received notification to the thread dependency tracking circuitry, wherein to determine whether the one or more dependencies have been satisfied comprises to receive, in response to having transmitted the received notification, an indication from the thread dependency tracking circuitry that the one or more dependencies have been satisfied.

Example 12 includes a method for integrated thread scheduling, the method comprising detecting, by a computing device, whether processing of a thread of the computing device is blocked by one or more communication operations; suspending, by a system thread scheduler of the computing device, the thread in response to detecting the processing of the thread is blocked; moving, by the computing device, the suspended thread from the system thread scheduler to a thread scheduling engine of a network interface controller of the computing device; identifying, by the thread scheduling engine, whether the thread has one or more dependencies; determining, by the thread scheduling engine, whether each of the one or more communication operations has completed; determining, by the thread scheduling engine and in response to a determination that the thread has the one or more dependencies, whether the one or more dependencies have been satisfied; and moving, by the thread scheduling engine, the thread from the thread scheduling engine to the system thread scheduler in response to a determination that (i) each of the one or more communication operations has completed and (ii) each of the one or more dependencies has been satisfied.

Example 13 includes the subject matter of Example 12, and wherein moving the thread from the system thread scheduler to the thread scheduling engine comprises moving the thread from a running queue of the system thread scheduler to a pending queue of the thread scheduling engine.

Example 14 includes the subject matter of any of Examples 12 and 13, and wherein moving the thread from the thread scheduling engine to the system thread scheduler includes moving the thread from a pending queue of the thread scheduling engine to a ready queue of the thread scheduling engine prior to the thread being moved to the system thread scheduler.

Example 15 includes the subject matter of any of Examples 12-14, and wherein moving the thread from the thread scheduling engine to the system thread scheduler further includes moving the thread from the pending queue of the thread scheduling engine to one of a running queue of the system thread scheduler or a ready queue of the system thread scheduler.

Example 16 includes the subject matter of any of Examples 12-15, and wherein moving the thread from the thread scheduling engine to the system thread scheduler comprises providing an indication to the thread scheduling engine that indicates the thread may be scheduled for execution.

Example 17 includes the subject matter of any of Examples 12-16, and wherein moving the thread from the system thread scheduler to the thread scheduling engine comprises appending a handle corresponding to the thread to a pending queue of the thread scheduling engine.

Example 18 includes the subject matter of any of Examples 12-17, and wherein identifying whether the thread has one or more dependencies comprises identifying whether the thread depends on one or more other threads.

Example 19 includes the subject matter of any of Examples 12-18, and wherein identifying whether the thread has one or more dependencies comprises identifying whether the thread depends on one or more communication operations.

Example 20 includes the subject matter of any of Examples 12-19, and further including transmitting, by the thread scheduling engine, the one or more dependencies to thread dependency tracking circuitry of the thread scheduling engine; and transmitting, by the thread scheduling engine, the received notification to the thread dependency tracking circuitry, wherein determining whether the one or more dependencies have been satisfied comprises receiving, in response to transmitting the received notification, an indication from the thread dependency tracking circuitry that the one or more dependencies have been satisfied.

Example 21 includes a computing device comprising a processor; and a memory having stored therein a plurality of instructions that when executed by the processor cause the computing device to perform the method of any of Examples 12-20.

Example 22 includes one or more machine readable storage media comprising a plurality of instructions stored thereon that in response to being executed result in a computing device performing the method of any of Examples 12-20.

Example 23 includes a computing device for integrated thread scheduling, the computing device comprising network communication circuitry to (i) detect whether processing of a thread of the computing device is blocked by one or more communication operations and (ii) suspend the thread in response to detecting the processing of the thread is blocked; thread scheduling circuitry to (i) move the suspended thread from the system thread scheduler to a thread scheduling engine of a network interface controller of the computing device, (ii) identify whether the thread has one or more dependencies, (iii) determine whether each of the one or more communication operations has completed, and (iv) determine, in response to a determination that the thread has the one or more dependencies, whether the one or more dependencies have been satisfied; and system thread scheduler interface circuitry to move the thread from the thread scheduling engine to the system thread scheduler in response to a determination that (i) each of the one or more communication operations has completed and (ii) each of the one or more dependencies has been satisfied.

Example 24 includes the subject matter of Example 23, and wherein to move the thread from the system thread scheduler to the thread scheduling engine comprises to move the thread from a running queue of the system thread scheduler to a pending queue of the thread scheduling engine.

Example 25 includes the subject matter of any of Examples 23 and 24, and wherein to move the thread from the thread scheduling engine to the system thread scheduler includes to move the thread from a pending queue of the thread scheduling engine to a ready queue of the thread scheduling engine prior to the thread being moved to the system thread scheduler.

Example 26 includes the subject matter of any of Examples 23-25, and wherein to move the thread from the thread scheduling engine to the system thread scheduler further includes to move the thread from the pending queue of the thread scheduling engine to one of a running queue of the system thread scheduler or a ready queue of the system thread scheduler.

Example 27 includes the subject matter of any of Examples 23-26, and wherein to move the thread from the thread scheduling engine to the system thread scheduler comprises to provide an indication to the thread scheduling engine that indicates the thread may be scheduled for execution.

Example 28 includes the subject matter of any of Examples 23-27, and wherein to move the thread from the system thread scheduler to the thread scheduling engine comprises to append a handle corresponding to the thread to a pending queue of the thread scheduling engine.

Example 29 includes the subject matter of any of Examples 23-28, and wherein to identify whether the thread has one or more dependencies comprises to identify whether the thread depends on one or more other threads.

Example 30 includes the subject matter of any of Examples 23-29, and, wherein to identify whether the thread has one or more dependencies comprises to identify whether the thread depends on one or more communication operations.

Example 31 includes the subject matter of any of Examples 23-30, and wherein the thread scheduling circuitry is further to (i) transmit the one or more dependencies to a thread dependency tracking circuitry of the thread scheduling engine and (ii) transmit the received notification to the thread dependency tracking circuitry, wherein to determine whether the one or more dependencies have been satisfied comprises to receive, in response to having transmitted the received notification, an indication from the thread dependency tracking circuitry that the one or more dependencies have been satisfied.

Example 32 includes a computing device to filter a received message, the computing device comprising means for detecting whether processing of a thread of the computing device is blocked by one or more communication operations; means for suspending, by a system thread scheduler of the computing device, the thread in response to detecting the processing of the thread is blocked; means for moving the suspended thread from the system thread scheduler to a thread scheduling engine of a network interface controller of the computing device; means for identifying, by the thread scheduling engine, whether the thread has one or more dependencies; means for determining, by the thread scheduling engine, whether each of the one or more communication operations has completed; means for determining, by the thread scheduling engine and in response to a determination that the thread has the one or more dependencies, whether the one or more dependencies have been satisfied; and means for moving, by the thread scheduling engine, the thread from the thread scheduling engine to the system thread scheduler in response to a determination that (i) each of the one or more communication operations has completed and (ii) each of the one or more dependencies has been satisfied.

Example 33 includes the subject matter of Example 32, and wherein the means for moving the thread from the system thread scheduler to the thread scheduling engine comprises means for moving the thread from a running queue of the system thread scheduler to a pending queue of the thread scheduling engine.

Example 34 includes the subject matter of any of Examples 32 and 33, and wherein the means for moving the thread from the thread scheduling engine to the system thread scheduler includes means for moving the thread from a pending queue of the thread scheduling engine to a ready queue of the thread scheduling engine prior to the thread being moved to the system thread scheduler.

Example 35 includes the subject matter of any of Examples 32-34, and wherein the means for moving the thread from the thread scheduling engine to the system thread scheduler further includes means for moving the thread from the pending queue of the thread scheduling engine to one of a running queue of the system thread scheduler or a ready queue of the system thread scheduler.

Example 36 includes the subject matter of any of Examples 32-35, and wherein the means for moving the thread from the thread scheduling engine to the system thread scheduler comprises means for providing an indication to the thread scheduling engine that indicates the thread may be scheduled for execution.

Example 37 includes the subject matter of any of Examples 32-36, and wherein the means for moving the thread from the system thread scheduler to the thread scheduling engine comprises means for appending a handle corresponding to the thread to a pending queue of the thread scheduling engine.

Example 38 includes the subject matter of any of Examples 32-37, and wherein the means for identifying whether the thread has one or more dependencies comprises means for identifying whether the thread depends on one or more other threads.

Example 39 includes the subject matter of any of Examples 32-38, and wherein the means for identifying whether the thread has one or more dependencies comprises means for identifying whether the thread depends on one or more communication operations.

Example 40 includes the subject matter of any of Examples 32-39, and further including means for transmitting, by the thread scheduling engine, the one or more dependencies to thread dependency tracking circuitry of the thread scheduling engine; and means for transmitting, by the thread scheduling engine, the received notification to the thread dependency tracking circuitry, wherein the means for determining whether the one or more dependencies have been satisfied comprises means for receiving, in response to transmitting the received notification, an indication from the thread dependency tracking circuitry that the one or more dependencies have been satisfied.

The invention claimed is:

1. A computing device for integrated thread scheduling, the computing device comprising:

a network interface controller (NIC);

one or more processors; and one or more data storage devices having stored therein a plurality of instructions that, when executed by the one or more processors, causes the computing device to:

detect whether processing of a thread of the computing device is blocked by one or more communication operations;

suspend the thread in response to detecting the processing of the thread is blocked;

move the suspended thread from a system thread scheduler of the computing device to a thread scheduling engine of the NIC;

identify, by the NIC, whether the thread has one or more dependencies;

determine, by the NIC, whether each of the one or more communication operations has completed;

determine, by the NIC and in response to a determination that the thread has the one or more dependencies, whether the one or more dependencies have been satisfied; and move, by the NIC, the thread from the thread scheduling engine to the system thread scheduler in response to a determination that (i) each of the one or more communication operations has completed and (ii) each of the one or more dependencies has been satisfied.

2. The computing device of claim 1, wherein to move the thread from the system thread scheduler to the thread scheduling engine comprises to move the thread from a running queue of the system thread scheduler to a pending queue of the thread scheduling engine.

3. The computing device of claim 1, wherein to move the thread from the thread scheduling engine to the system thread scheduler includes to move the thread from a pending queue of the thread scheduling engine to a ready queue of the thread scheduling engine prior to the thread being moved to the system thread scheduler.

4. The computing device of claim 3, wherein to move the thread from the thread scheduling engine to the system thread scheduler further includes to move the thread from the pending queue of the thread scheduling engine to one of a running queue of the system thread scheduler or a ready queue of the system thread scheduler.

5. The computing device of claim 4, wherein to move the thread from the thread scheduling engine to the system thread scheduler further includes to provide an indication to the thread scheduling engine that indicates the thread may be scheduled for execution.

6. The computing device of claim 1, wherein to identify whether the thread has one or more dependencies comprises to identify whether the thread depends on one or more other threads or one or more communication operations.

7. The computing device of claim 1, wherein the plurality of instructions further causes the network interface controller to:

receive, by a pending thread queue management module of the NIC, a notification indicative of completion of a dependency of the one or more dependencies of the thread, wherein to determine whether the one or more dependencies have been satisfied comprises to determine, by the pending thread queue management module in response to having received the notification, whether each dependency of the one or more dependencies of the thread has received a corresponding notification.

8. The computing device of claim 1, further comprising a system-on-a-chip (SoC) that includes the one or more processors and the network interface controller.

9. The computing device of claim 1, further comprising a multichip package that includes the one or more processors and the network interface controller.

10. One or more non-transitory, computer-readable storage media comprising a plurality of instructions stored thereon that in response to being executed cause a computing device to:

detect whether processing of a thread of the computing device is blocked by one or more communication operations;

suspend the thread in response to detecting the processing of the thread is blocked;

move the suspended thread from a system thread scheduler of the computing device to a thread scheduling engine of a network interface controller (NIC) of the computing device;

identify, by the NIC, whether the thread has one or more dependencies;

determine, by the NIC, whether each of the one or more communication operations has completed;

determine, by the NIC and in response to a determination that the thread has the one or more dependencies, whether the one or more dependencies have been satisfied; and move, by the NIC, the thread from the thread scheduling engine to the system thread scheduler in response to a determination that (i) each of the one or more communication operations has completed and (ii) each of the one or more dependencies has been satisfied.

11. The one or more non-transitory, computer-readable storage media of claim 10, wherein to move the thread from the system thread scheduler to the thread scheduling engine comprises to move the thread from a running queue of the system thread scheduler to a pending queue of the thread scheduling engine.

12. The one or more non-transitory, computer-readable storage media of claim 10, wherein to move the thread from the thread scheduling engine to the system thread scheduler includes to move the thread from a pending queue of the thread scheduling engine to a ready queue of the thread scheduling engine prior to the thread being moved to the system thread scheduler.

13. The one or more non-transitory, computer-readable storage media of claim 12, wherein to move the thread from the thread scheduling engine to the system thread scheduler further includes to move the thread from the pending queue of the thread scheduling engine to one of a running queue of the system thread scheduler or a ready queue of the system thread scheduler.

14. The one or more non-transitory, computer-readable storage media of claim 10, wherein to move the thread from the thread scheduling engine to the system thread scheduler comprises to provide an indication to the thread scheduling engine that indicates the thread may be scheduled for execution.

15. The one or more non-transitory, computer-readable storage media of claim 10, wherein to identify whether the thread has one or more dependencies comprises to identify whether the thread depends on one or more other threads or one or more communication operations.

16. The one or more non-transitory, computer-readable storage media of claim 10, wherein the plurality of instructions further causes the computing device to:

receive, by a pending thread queue management module of the NIC, a notification indicative of completion of a dependency of the one or more dependencies of the thread, wherein to determine whether the one or more dependencies have been satisfied comprises to determine, by the pending thread queue management module in response to having received the notification, whether each dependency of the one or more dependencies of the thread has received a corresponding notification.

17. A method for integrated thread scheduling, the method comprising:

detecting, by a computing device, whether processing of a thread of the computing device is blocked by one or more communication operations;

suspending, by a system thread scheduler of the computing device, the thread in response to detecting the processing of the thread is blocked;

moving, by the computing device, the suspended thread from the system thread scheduler to a thread scheduling engine of a network interface controller of the computing device;

identifying, by the thread scheduling engine, whether the thread has one or more dependencies;

determining, by the thread scheduling engine, whether each of the one or more communication operations has completed;

determining, by the thread scheduling engine and in response to a determination that the thread has the one or more dependencies, whether the one or more dependencies have been satisfied; and moving, by the thread scheduling engine, the thread from the thread scheduling engine to the system thread scheduler in response to a determination that (i) each of the one or more communication operations has completed and (ii) each of the one or more dependencies has been satisfied.

18. The method of claim 17, wherein moving the thread from the system thread scheduler to the thread scheduling engine comprises moving the thread from a running queue of the system thread scheduler to a pending queue of the thread scheduling engine.

19. The method of claim 17, wherein moving the thread from the thread scheduling engine to the system thread scheduler includes moving the thread from a pending queue of the thread scheduling engine to a ready queue of the thread scheduling engine prior to the thread being moved to the system thread scheduler, and wherein moving the thread from the thread scheduling engine to the system thread scheduler further includes moving the thread from the pending queue of the thread scheduling engine to one of a running queue of the system thread scheduler or a ready queue of the system thread scheduler.

20. The method of claim 17, wherein moving the thread from the thread scheduling engine to the system thread scheduler comprises providing an indication to the thread scheduling engine that indicates the thread may be scheduled for execution.

21. The method of claim 17, wherein moving the thread from the system thread scheduler to the thread scheduling engine comprises appending a handle corresponding to the thread to a pending queue of the thread scheduling engine.

22. The method of claim 17, wherein identifying whether the thread has one or more dependencies comprises identifying at least one of whether the thread depends on one or more other threads and whether the thread depends on one or more communication operations;

means for receiving, by the thread scheduling engine, a notification indicative of completion of a dependency of the one or more dependencies of the thread, and wherein the means for determining whether the one or more dependencies have been satisfied comprises to means for determining, by the thread scheduling engine in response to having received the notification, whether each dependency of the one or more dependencies of the thread has received a corresponding notification.

23. The method of claim 17, further comprising:

receiving, by the thread scheduling engine, a notification indicative of completion of a dependency of the one or more dependencies of the thread, wherein determining whether the one or more dependencies have been satisfied comprises determining, by the thread scheduling engine in response to having received the notification, whether each dependency of the one or more dependencies of the thread has received a corresponding notification.

24. A computing device to filter a received message, the computing device comprising:

means for detecting whether processing of a thread of the computing device is blocked by one or more communication operations;

means for suspending, by a system thread scheduler of the computing device, the thread in response to detecting the processing of the thread is blocked;

means for moving the suspended thread from the system thread scheduler to a thread scheduling engine of a network interface controller of the computing device;

means for identifying, by the thread scheduling engine, whether the thread has one or more dependencies;

means for determining, by the thread scheduling engine, whether each of the one or more communication operations has completed;

means for determining, by the thread scheduling engine and in response to a determination that the thread has the one or more dependencies, whether the one or more dependencies have been satisfied; and means for moving, by the thread scheduling engine, the thread from the thread scheduling engine to the system thread scheduler in response to a determination that (i) each of the one or more communication operations has completed and (ii) each of the one or more dependencies has been satisfied.

25. The computing device of claim 24, further comprising:

means for receiving, by the thread scheduling engine, a notification indicative of completion of a dependency of the one or more dependencies of the thread, and wherein the means for determining whether the one or more dependencies have been satisfied comprises means for determining, by the thread scheduling engine in response to having received the notification, whether each dependency of the one or more dependencies of the thread has received a corresponding notification.

* * * * *